No. 700,679. Patented May 20, 1902.
H. E., F. L. & E. G. EBERHARDT.
CRANK PLANER OR ANALOGOUS TOOL.
(Application filed June 13, 1901.)
(No Model.) 5 Sheets—Sheet 1.

Attest:
L. Lee
Walter H. Talmage.

Inventors
Henry E. Eberhardt,
Fred L. Eberhardt, Elmer G. Eberhardt
per Thomas S. Crane, Atty.

No. 700,679. Patented May 20, 1902.
H. E., F. L. & E. G. EBERHARDT.
CRANK PLANER OR ANALOGOUS TOOL.
(Application filed June 13, 1901.)
(No Model.) 5 Sheets—Sheet 2.

Attest:
L. Lee
Walter H. Talmage.

Inventors.
Henry E. Eberhardt, Elmer G. Eberhardt,
Fred L. Eberhardt per Thos. S. Crane, Atty.

No. 700,679. Patented May 20, 1902.
H. E., F. L. & E. G. EBERHARDT.
CRANK PLANER OR ANALOGOUS TOOL.
(Application filed June 18, 1901.)
(No Model.) 5 Sheets—Sheet 3.

No. 700,679. Patented May 20, 1902.
H. E., F. L. & E. G. EBERHARDT.
CRANK PLANER OR ANALOGOUS TOOL.
(Application filed June 18, 1901.)
(No Model.) 5 Sheets—Sheet 4.

Attest:
L. Lee.
Walter H. Talmage.

Inventors.
Henry E. Eberhardt,
Fred L. Eberhardt, Elmer G. Eberhardt,
per Thomas S. Crane, Atty.

No. 700,679. Patented May 20, 1902.
H. E., F. L. & E. G. EBERHARDT.
CRANK PLANER OR ANALOGOUS TOOL.
(Application filed June 18, 1901.)
(No Model.) 5 Sheets—Sheet 5.

Attest:
L. Loew.
Walter H. Talmage.

Inventors.
Henry E. Eberhardt,
Fred L. Eberhardt and Elmer G. Eberhardt,
per Thos. S. Crane, Atty.

UNITED STATES PATENT OFFICE.

HENRY E. EBERHARDT AND FRED L. EBERHARDT, OF NEWARK, NEW JERSEY, AND ELMER G. EBERHARDT, OF ITHACA, NEW YORK, ASSIGNORS TO GOULD & EBERHARDT, OF NEWARK, NEW JERSEY, A CORPORATION OF NEW JERSEY.

CRANK-PLANER OR ANALOGOUS TOOL.

SPECIFICATION forming part of Letters Patent No. 700,679, dated May 20, 1902.

Application filed June 13, 1901. Serial No. 64,373. (No model.)

*To all whom it may concern:*

Be it known that we, HENRY E. EBERHARDT, residing at 84 Elm street, and FRED L. EBERHARDT, residing at 17 Hillside avenue, Newark, Essex county, New Jersey, and ELMER G. EBERHARDT, residing at Ithaca, Tompkins county, New York, citizens of the United States, have invented certain new and useful Improvements in Crank-Planers or Analogous Tools, fully described and represented in the following specification and the accompanying drawings, forming a part of the same.

The present invention relates to various improvements in a crank-planer, shaping-machine, or analogous tool having a table adjustable vertically upon the bed and having a reciprocating ram to operate the tool. In such machines it is common to reciprocate the pitman by a crank-pin having a bearing-block fitted to a slot in the pitman; and the present invention includes an improved connection between an eccentrically-pivoted crank-plate and a disk for driving such plate, by which pins are projected, respectively, from the disk and the crank-plate and connected by a link, so that the uniform motion of the driving-disk produces a variable motion of the crank-plate, which increases the velocity of the ram near the ends of the stroke. It is sometimes desirable to insert a shaft or long work-piece under the ram to make the tool move longitudinally of such piece, and it is especially desirable to support such piece as close as possible to the ram. To secure this result, I form the pitman with a solid boss adjacent to the ram and perforate it with an eye to permit the passage of the shaft, the joint for the pitman and the ram being preferably formed in the interior of the ram, so that the boss upon the pitman may be formed close to the under side of the ram. In such machines it is common to make the work-table adjustable vertically upon the frame of the machine and to operate a feed-screw upon such table by a link connected with an oscillating shaft. Such shaft is commonly fitted to a fixed bearing, and when the table is raised and lowered the distance between such shaft and table varies, and the length of the link requires a corresponding change. Heretofore an extensible link has been used with a socket having a set-screw to clamp the two parts of the link together when its length is altered; but the present invention provides a link whose length adjusts itself automatically to the situation of the table when the same is raised or lowered, and such automatic adjustment is secured by furnishing the link with a friction sliding joint and the feeding mechanism upon the table with stops which automatically change the length of the link when the table is raised or lowered. By thus adjusting the length of the link the pawl-arm is enabled to work over the same arc of the feed-gear, and breakage of the gears is avoided, which sometimes arises from the straining of the arm into an improper position. Various means have been devised for supporting the work-table at its outer end to prevent its springing under the strain of the tool, the first of these devices being shown in Patent No. 541,475, granted to Eberhardt *et al.* June 25, 1895, and embracing a standard bolted adjustably to the table and fitted at its lower end to slide upon an extension-base projected from the main bed-plate of the machine. We have found in the use of such invention that the extension-base of the shaping-machine does not always maintain its parallelism with the cross-head upon which the table travels, and our present invention embraces a rail to support such standard and means for setting the rail level or parallel with the cross-head, whereby the table may receive an equal support in all parts of its travel over the base. The extension-base is liable to such variations of relation to the cross-head, because of its projection from the main bed and its susceptibility to spring and yield under various conditions. To evade the claim to a standard adjustable upon the table, means have been devised to support the table at various heights above the extension-base by securing a column upon the extended base and supporting a slide adjustably upon the column to support a slider at the outer end of the table. In such construction the slide upon the column can only be set level by lifting it to the under side of the table-slider and securing it upon the column by bolts; but such construction furnishes no means of pressing the column-slide upward or balancing the elasticity of the table, which thus leaves it liable to vibrate or "chatter" under the strain of the tool. As the table is in a crank-planer raised and lowered a very considerable distance, the column, such as is referred to, requires a considerable height, and thus stands in front of the table and obstructs the convenient access thereto. To overcome all the objections to such a column and to the standard of Eberhardt et al., we have devised the rail secured upon the base and provided with means for varying the height of its opposite ends, so as to set it level or parallel with the cross-head at any time that the base varies from parallelism therewith. To avoid raising the rail considerably above the base, we use the standard adjustable vertically upon the table, and to avoid obstructing access to the table by locating the rail outside the end of the table we may recess the front end of the table and fit the standard into such recess, thus bringing the rail under the outer end of the standard, where it is quite out of the way. The adjustment of the standard upon the table compensates nearly for the entire vertical movement of the table, and the remainder of such variation may be effected by adjusting the rail vertically for a short distance. To take up the spring of the table, and thus prevent its chattering under the strain of the tool, we provide the rail with screws for pressing it bodily upward into firm contact with the bottom of the standard, thus exerting a positive pressure upon the two parts to resist the strain of the tool. The bottom of the standard is held parallel with the cross-head at all times by means of guides upon the table, which fit closely upon the vertical sides of the standard, and thus determine its position in all adjustments. A rail or any level support for the outer end of the table is liable to be dented and injured by tools or work-pieces falling thereon, and to obviate such injury to the rail we prefer to furnish its outer edge with a raised rib, which receives the impact of falling objects and prevents them from touching the rail. A rail located but a few inches above the extension-base furnishes a natural foot-rest for the workman and is generally used for such purpose, and the rib prevents the foot of the workman from wearing and scratching the seat or supporting-surface of the rail. To catch any dirt that may be scraped from the shoes of the workman upon the supporting-rib, a gutter is formed between such rib and the supporting-seat, and such gutter serves to catch the dirt and prevent its sliding upon the seat. These improvements will be understood by reference to the annexed drawings, in which—

Figure 1 is a side elevation of the machine, showing only the parts relating to the ram-driving mechanism, the main frame and base being shown in section where hatched. Fig. 2 is a section where hatched through the center line of the pitman G to the top of the slot G' and thence along one edge of the pitman. Fig. 1$^a$ is a view, enlarged, of the cam-block for oscillating the feed-shaft. Fig. 2$^a$ is a plan of the feed-arm with the block pivoted thereon, and Fig. 3$^a$ is an elevation of the inner end of the same parts with the bearing for the feed-shaft. Fig. 3 is a side elevation of the machine with a shaft partly in section beneath the tool. Fig. 4 is a plan of the stops for the feed mechanism upon the cross-head, the feed-arm and link being shown in section through the center line of the feed-arm and link. Fig. 5 is a front view, and Fig. 6 an edge view, of the extensible feed-link; and Fig. 7 is an end view of the same in section on line 7 7 in Fig. 5. Figs. 8, 9, 10, 11, 14, 15, 18 to 24 are upon a larger scale than the other figures to illustrate the details of construction.

Figures 1, 1A, 2, 2A, 3A:
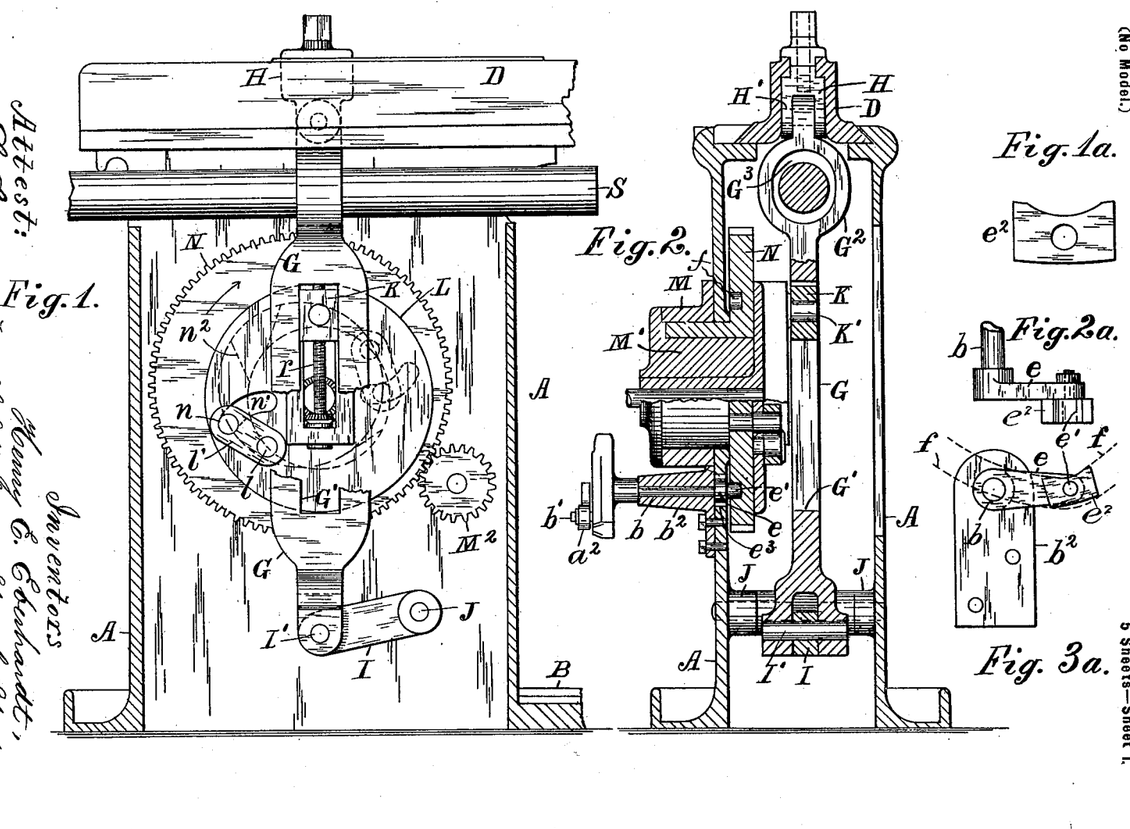
Figures 3, 4, 5, 6, 7:
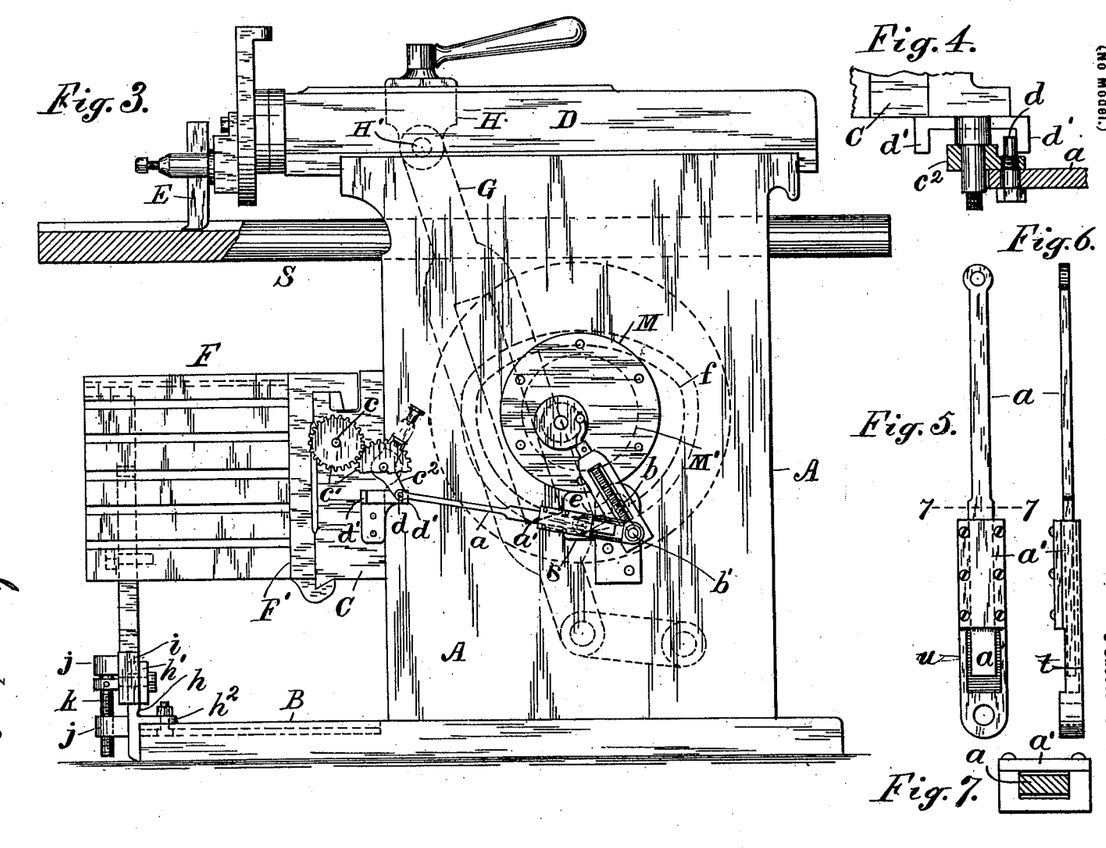
Figure 8:
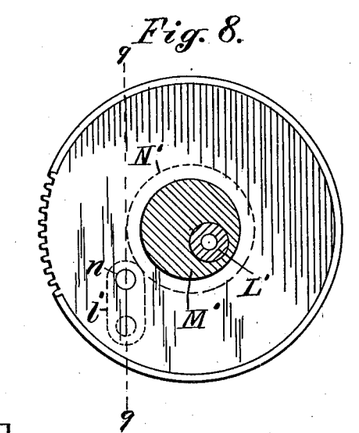
Fig. 8 is a front view of the driving-disk with section of the crank-plate hub and its bearing.
Figure 9:
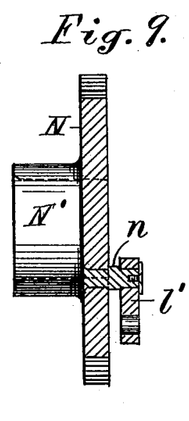
Fig. 9 is a section on line 9 9 in Fig. 8.
Figure 10:
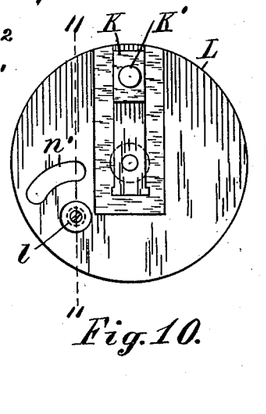
Fig. 10 is a front view of the crank-plate.
Figure 11:
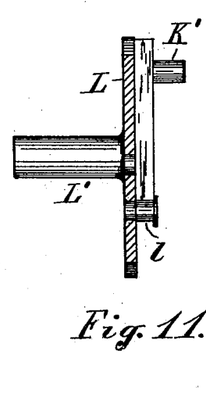
Fig. 11 is a section on line 11 11 in Fig. 10.

A designates the frame of the machine, shown of box form—that is, with flat plates at its opposite sides and having a boss B extended forwardly under the cross-head C, which is adjustable vertically upon the front of the frame by any suitable means. The ram D reciprocates the tool E over the table F, attached to a saddle F' upon the cross-head. The pitman G is jointed directly to a block H, which is secured adjustably within the ram by making the ram hollow, as shown in Fig. 2, so that the joint-pin H' may be above the bottom of the ram. The pitman is pivoted at the bottom to a link I, having a fixed bearing J upon the frame. The bottom of the pin is forked to embrace the ends of the link I and secure an extended wearing-surface for the joint-pin I'. The block H is forked to directly admit a lug extended from the upper end of the pitman, and a boss $G^2$ is formed upon the pitman immediately below its joint with the block H and provided with hole $G^3$ parallel to the ram to permit the passage of a long work-piece, as the shaft S. (Shown in Figs. 1, 2, and 3.) The tipping of the pitman (shown in Fig. 3) presents the opposite edges of the hole $G^3$ alternately to the shaft S, and the hole is preferably made oblong vertically, as shown in Fig. 2, so that the corners may clear the shaft. By making forks upon the block H and extending the lug upon the upper end of the pitman directly into such fork the hole $G^3$ is brought as close as possible to the under side of the ram. We have made special claim to these features of the pitman, as they are mechanical details of importance in the wear and use of the machine. The pitman is provided with the usual slot $G'$ for the crank-block K, the block being carried upon the pin $K'$, which is held adjustably upon a crank-plate L by any usual means, as the screw shown extending through the crank-block K in Fig. 1. A journal-socket M is attached to one of the frame-plates, as shown in Fig. 2, and a journal-bearing $M'$ supported thereby. The driving-disk N has a hub $N'$ fitted to an annular space between the socket M and bearing $M'$ and is shown provided with teeth upon its periphery to engage a driving-pinion $N^2$. (See Fig. 1.) The bearing $M'$ is formed with an eccentric hole, as shown in Figs. 2, 3, and 8, to support the hub $L'$ of the crank-plate L, and the center line of the pitman when in its middle position, as shown in Fig. 1, traverses the axis of the crank-plate, so that the crank-block moves the pitman equally to opposite sides of the center.

*Connection of disk and crank-plate.*—It will be observed that the disk N and the crank-plate L are both overhung upon the inside of the frame from the bearing $M'$, and the crank-plate is thus enabled to fit close upon the face of the disk and the pitman to vibrate in front of the crank-plate without any obstruction. The disk is furnished with the pin $n$ and the crank-plate with the pin $l$, and the said pins are connected by the links $l'$, which operate when the disk is rotated at a uniform rate to give the crank-plate a variable motion. A slot $n'$ is shown extended through the crank-plate for the lateral movement of the pin $n$ as the link takes successively the positions indicated by the dotted lines $n^2$ in Fig. 1. These lines are connected with two dotted circles, one concentric with the hub $N'$ and the other with the hub $L'$ and drawn through the centers of the pins $l$ and $n$ in different positions. An eccentric connection of the crank-plate and disk has been effected by other means; but the pins and link form an exceedingly strong and cheap construction for connecting such overhung parts in revolving contiguity to one another, so as to produce the quick return motion of the ram which results from such eccentric driving-gear. It is obvious that the link $l'$ can be inserted in a recess in the face of the disk between the body of the disk and the crank-plate, and thus be wholly concealed from sight; but the construction shown renders the parts more accessible for inspection and repairs.

Figure 13:
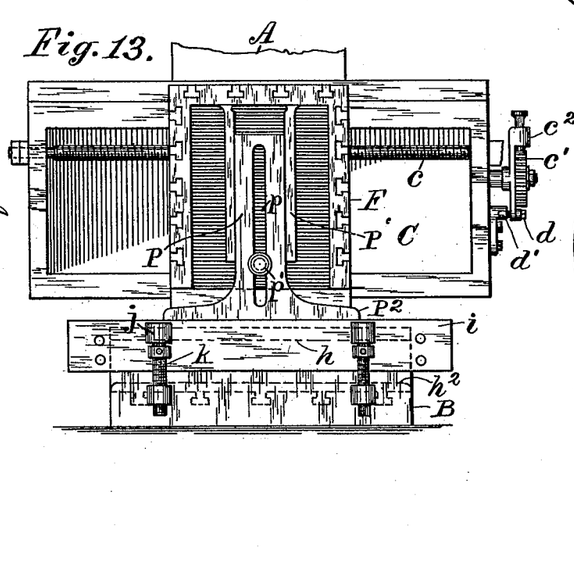
Fig. 13 is a front elevation of the planer, showing only the parts relating to the table and its supports. The guard-rib is omitted in Figs. 12 and 13 to avoid concealing the adjacent parts.
Figure 14:
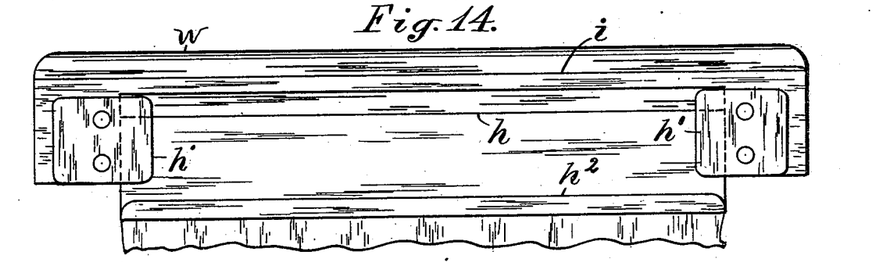
Fig. 14 is a rear elevation, and Fig. 15 a central cross-section, of the rail, shown in Fig. 14.

*Feed connection from driving-disk.*—The cross-head C is shown in Fig. 13 provided with the usual feed-screw $c$, and the end of the cross-head is provided with gears $c'$ to rotate such screw. A ratchet rocker-arm or oscillating lever $c^2$ is provided with a pawl to intermittently operate one of the gears $c'$, which serves as a ratchet-gear, and such arm carries a stud $d$, which is vibrated normally between stops $d'$ upon the cross-head. A connecting-rod pivoted upon the stud $d$ is shown extended to a feed-crank $b'$ upon the end of an oscillating feed-shaft $b$, which is carried in a bearing $b^2$ upon one of the plates of the frame adjacent to the driving-disk N. A cam-groove $f$ is formed in the side of the disk N adjacent to the plate of the frame A, and an aperture $s$ is formed in the frame to admit an arm $e$ upon the inner end of the feed-shaft $b$, such arm having a block, roll, or pin fitted to the cam-groove to oscillate the feed-shaft. A pin $e'$ is shown upon the end of the arm in Fig. 2; but Fig. $3^a$ shows the inner end of the bearing $b^2$ with a block $e^2$ fitted to the pin $e'$ upon the arm $e$. The block $e^2$ is also shown in Fig. $2^a$. The cam-groove $f$ is chiefly concentric, but with a flattened portion shown upon the upper side of the groove in Fig. 3, which vibrates the arm $e$ when required. The block $e^2$ is fitted to move in the cam-groove where it curves uniform; but where the flattened curve joins the concentric curve the block is unable to pass the corner and would therefore form a notch $f'$ upon the inner side of the block, as shown in Figs. $1^a$ and $3^a$, the latter figure showing the block at the corner of the groove. The feed-shaft bearing $b^2$ extends at right angles to the face of the disk N, so that the arm $e$ lies parallel with such face, and the movement of the pin $e'$ or block $e^2$ is transverse of the cam-groove. This construction furnishes a direct connection between the feed-shaft and the disk N without the intervention of any eccentric or connecting rod to actuate such shaft, and the bearing $b^2$ is made detachable and secured to the plate of the frame A by bolts $d$, by which construction the crank $e$ and its pin or block can be inserted into their working position or withdrawn for inspection and repairs while the disk N is in place.

*Slip-joint for operating the feed.*—A sliding friction-joint is inserted between the feed-shaft and the feed-pawl arm, by which the arm carrying the pawl is enabled to always move within a given arc about the ratchet-wheel $c'$, so that, if desired, a gravity-pawl (shown at $c^3$ in Fig. 20) may be used to work in either direction upon the top of the ratchet-gear. Such friction-joint may be applied to the hub of any of the levers or to the connecting-rod which joins the oscillating lever to the feed-crank $b'$. When applied to the lever $c^2$, it serves the purpose just mentioned and also avoids the breakage of the gears if the rotation of the screw is hindered by any cause. When applied to the connecting-rod, it also serves another purpose of altering the length of the rod automatically to correspond with variations in the height of the cross-head or table, and thus preserving the proper relation to the feed-crank of the arc through which the lever $c^2$ vibrates. When applied to the connecting-rod, as shown in Figs. 3 to 6, inclusive, the rod is made in two parts, one of which, $a$, is fitted to the other by a sliding joint, the latter having a cap $a'$ or means for pressing upon the part $a$ to produce sufficient friction for actuating the ratchet rocker-arm or lever $c^2$. Inspection of Fig. 3 shows that the raising of the table F upon the frame A draws the rocker-arm $c^2$ away from the feed-shaft $b$, and thus requires an increased length of the feed-connecting rod. The space between the stops $d'$ is proportioned to furnish sufficient room for the vibration of the stud $d$ when the feed is normally operated; but when the connecting-rod becomes too short by the raising of the cross-head the stud is brought in contact with one of the stops $d'$, as shown in Figs. 3 and 4, by the normal vibrations of the feed-crank $b'$. Such contact stretches the feed-connecting rod to the required length, the feed-crank $b'$ operating thereafter to vibrate the stub between the stops without hindrance. Conversely, when the feed-connecting rod becomes too long by the lowering of the cross-head the stud $d$ strikes the opposite stop, and the connecting-rod is automatically shortened in the desired degree.

Figures 20, 22:
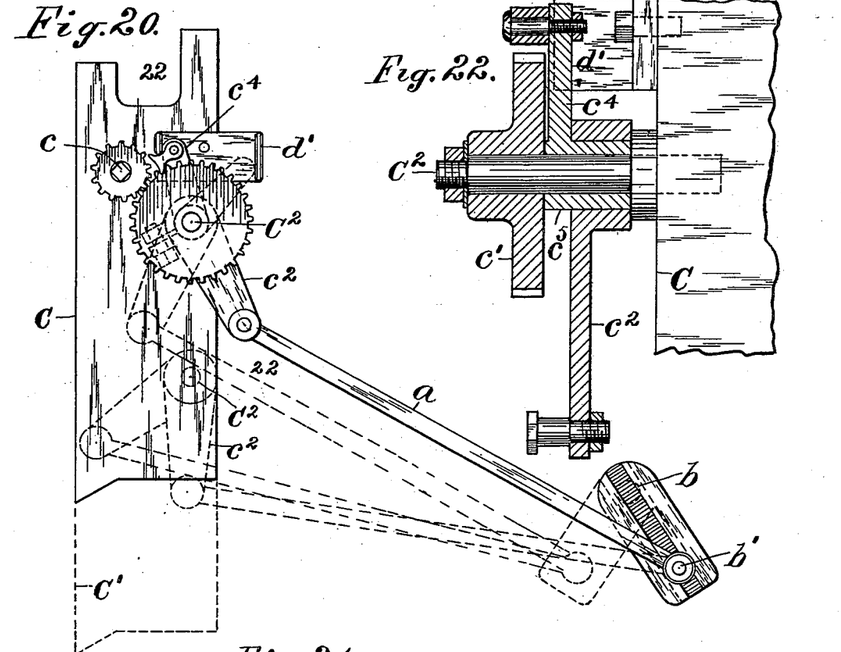
Figs. 20 to 24 show details of the friction-joint for the feed mechanism.
Figures 21, 23:
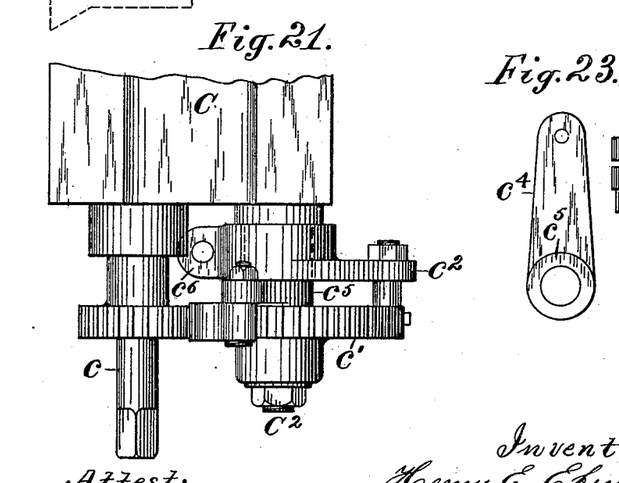
Figure 24:
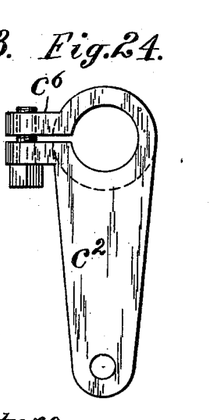

The application of the sliding joint to the hub of the oscillating lever $c^2$ is shown in Figs. 20 to 24, inclusive, Fig. 20 showing an end view of the cross-head and feed-shaft. Fig. 21 is a plan of the same parts upon a still larger scale. Fig. 22 is a section of the feed-gearing, taken on a line through the arms of levers $c^2$ and $c^4$. Fig. 23 is an end view of the pawl-arm, and Fig. 24 an end view of the oscillating lever, detached from one another. Figs. 21 to 24, inclusive, are drawn twice as large as the same parts in Fig. 20. In Fig. 20 the cross-head is shown in an elevated position in full lines and in a lower position in dotted lines C'. The pawl is carried by an arm $c^4$, which is provided with a hub $c^5$, journaled upon a stationary stud $C^2$, upon which hub the oscillating lever $c^2$ is journaled, and is provided with clamping-ears $c^6$, which can be adjusted to produce sufficient friction to actuate the feed, but adjusted to slip if any greater resistance arises. The stops $d'$ are shown arranged at opposite sides of the pawl-arm $c^4$, so as to restrict it always within a certain range of movement over the top of the ratchet-wheel $c'$, and such stops furnish a resistance which causes the lever $c^2$ to slip upon the hub of the arm $c^4$ whenever the adjustment of the cross-head upon the frame of the machine varies the distance between the stud $C^2$ and the feed-shaft $b$. Such readjustment of the lever $c^2$ is shown in dotted lines in the lower part of Fig. 20, where the lowering of the cross-head brings the stud $C^2$ nearly to the shaft $b$ and causes the connecting-rod $a$ to push the lever $c^2$ around to the left upon the hub $c^5$ of the pawl-arm. Such slip-joint between the lever $c^2$ and the arm $c^4$ obviates breakage of the gears in case of undue resistance to the screw and keeps the pawl always upon the upper side of the gear $c'$; but it does not compensate fully for the changes of position in the cross-head by preserving the operative relation of the lever $c^2$ and the feed-crank $b'$, which is fully effected by a slip-joint in the connecting-rod $a$.

Any species of friction-clamp or slip-joint is suitable for the feed-connecting rod, provided sufficient friction is produced to operate the feed normally and the parts adapted to slip when the stud contacts with either of the stops. In Figs. 5 to 7, inclusive, one part, $a$, of the connecting-rod is shown with a flat end fitted to a rectangular box upon the other part, $u$, of the connecting-rod, and such box is lined with leather $t$ and formed with a cover $a'$, having screws to press the leather facings upon the part $a$. The pressure of the leather upon the part $a$ is so graduated as to move the feed mechanism normally without slipping, but to slip if any further strain is opposed to the movement of the feed-gearing. Such slippage of the link avoids any breakage of the gears if the table is fed to its extreme limit, so that the feed-screw can rotate no farther, and it also avoids breakage of the gears if a crank upon the screw, such as is commonly used for turning it by hand, should meet any unusual obstruction, and the friction-joint thus forms a safety device. The extensible link may be made with a round joint instead of a flat joint, and any means to produce the required friction is of course equivalent to what we have shown. Such friction-joint clearly distinguishes our extensible link from anything like a socket and set-screw which requires to be set by hand.

The slip-joint can be applied to the hub of the crank which carries the pin $b'$, so as to connect the crank movably with the feed-shaft $b$, and such construction permits the feed-arm when controlled by the stops $d'$ to operate upon the same arc of the ratchet-wheel $c'$. The slip-joints thus applied to the hubs of the arms or cranks do not compensate for variations in the elevation of the table, but forces the oscillating lever $c^2$ or the crank which carries the pin $b'$ to swing at one side or the other of its fulcrum in an undesirable manner. By inserting the slip-joint in the feed-connecting rod the rod adapts itself to various elevations of the table and permits the lever and feed-crank to oscillate in a normal manner.

Figure 12:
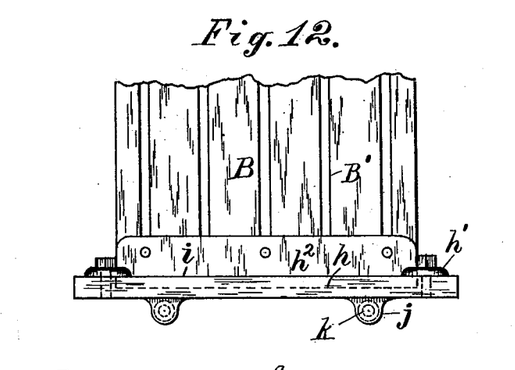
Fig. 12 is a plan of the extension-base and the rail thereon.
Figure 15:
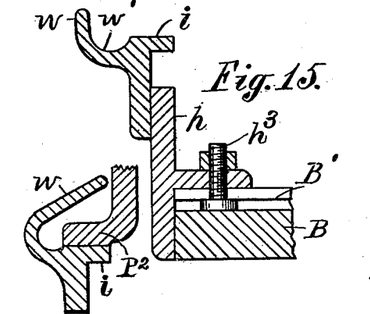

Our improvement in the table-support is shown in one form in Figs. 12 to 15, Figs. 12 and 13 showing a standard or leg P secured within the front side of the table and slotted, as in the before-mentioned Patent No. 541,475, to raise and lower it upon the table. The table is provided with suitable seats for the standard and with guides fitted closely to it to hold it exactly vertical and permit it a rectilinear movement, so that its lower end may always be level. In these figures the rail $i$ is shown supported upon the extension-base B by a rail-bed possessing a vertical plate $h$, to one side of which a flange upon the rail is fitted. The rail-bed is bolted to the extension-base by a flange $h^2$ and bolts $h^3$. The rail is provided with gibs $h'$ at its opposite ends to clamp the ends of the bed, and lugs $j$ are projected from the front of the rail and its bed to receive adjusting-screws $k$. Each screw operates to raise one end of the rail independent of the other, and thus serves to set the rail level or parallel with the cross-head C. To assist in setting the rail level, the bottom of the standard or leg P is furnished with a horizontal foot which is made exactly parallel with the cross-head, so that when the rail is adjusted to the lower side of such foot it serves to support the table equally at all parts of its travel. The horizontality of the foot is maintained by the close fitting of the standard to its guides. The screws $k$ serve not only to set the rail level, but to press it upward firmly against the under side of the foot, so as to lift the weight of the table and neutralize its elasticity, and thus prevent it from trembling under the strain of the tool. Such adjusting-screws also serve when the table is sprung downward by an exceptional weight to raise it positively to its normal position, which is readily determined by a level or by comparison with the under side of the ram or the path of the tool. The capacity of these screws for taking up the strain of the tool and balancing the elasticity of the table and any depression caused by its load renders them a very valuable adjunct in connection with any table-support, and we do not limit ourselves to the precise construction of table-support herein shown for using such screws, as they may be applied by suitable changes to many existing table-supports. To bring the rail underneath the table, the front end of the table may be recessed, as shown in Figs. 12 and 13, and the foot of the standard thus project beneath the lower side of the table and near enough to its forward end to give it an adequate support while the rail is thus located within the front line of the table. As the extension-base is used almost wholly for thus supporting the table, it may be made shorter by these means than if it were projected outward beyond the table, and it thus interferes less with the standing room of the workman in front of the machine. Where the table moves downward close to the base and the rail is located under the table, the rail can be only a few inches in height; but as the vertical adjustment of the leg upon the table is limited by the depth of the table the bed for the rail may be utilized to adjust it for a short distance to assist in supporting the table when at its greatest elevation. Such a low rail furnishes a natural foot-rest for the operator, and to prevent any such use of the rail from scratching its surface or accumulating dirt thereon a rib $w$ is projected upward from one edge of the rail sufficiently to support the foot. To prevent any dirt scratched by the rib from the foot from falling upon the rail, a gutter $w'$ may, as shown in Fig. 15, be formed between the rail and the rib to retain such dirt. Any rib projected above the top of the rail also serves to intercept any objects, as tools or castings, which may fall from the work-table and which would otherwise bruise or injure the surface of the rail and prevent it from affording a smooth and uniform seat for the support of the standard. The rib may also be inclined over the top of the rail, as shown in Fig. 19, to prevent grit and dirt from settling upon the same, the foot of the standard being extended laterally to fit upon the rail beneath such rib.

Figure 16:
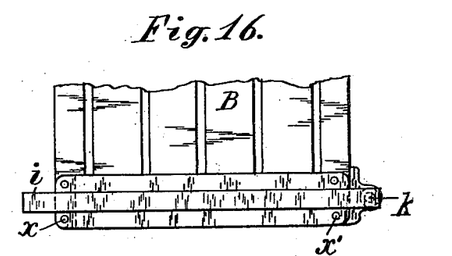
Fig. 16 is a plan, and Fig. 17 an elevation, of an alternative construction for the rail.
Figure 17:
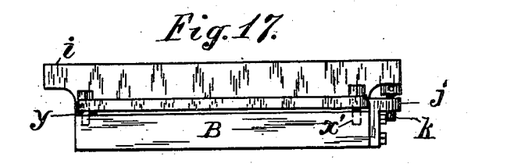

Figs. 16 and 17 show a construction for the rail in which the means of adjustment does not serve to raise and lower it or to press it upward bodily against the foot of the standard, as one end of the rail is secured rigidly to the extension-base by bolt or bolts and the opposite end supported upon a set-screw $z$, which serves to merely set it level or parallel with the cross-head. When thus set, it is clamped by bolts $x'$ adjacent to the set-screw. The fixed end of the rail is raised above the base by a small block $y$ to permit the movement of the opposite end above or below such point of support.

Figure 18:
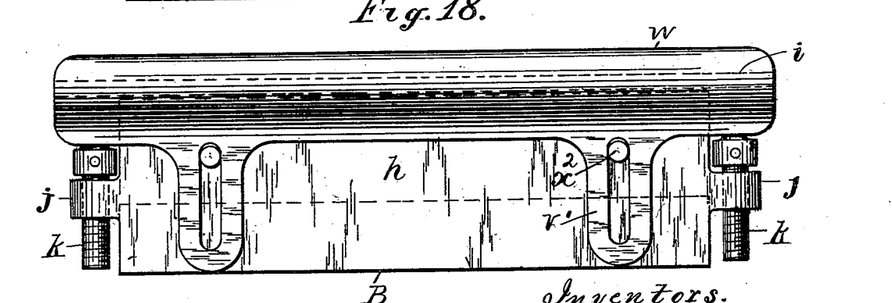
Fig. 18 is an elevation, and Fig. 19 a central cross-section, of a further alternative construction for the rail.
Figure 19:
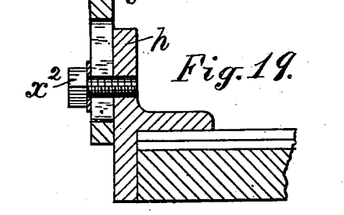

Figs. 18 and 19 show a rail supported upon a bed analogous to that in Figs. 12 and 13; but instead of the gibs $h'$ at the ends of the rail the adjacent screws are located at the ends of the rail, and the rail is furnished with slots $v'$, through which bolts $x^2$ clamp it to the bed when adjusted, such slots in Fig. 18 being located in the position occupied by the screws upon the rail in Fig. 12.

The constructions shown in Figs. 14 to 19 all serve to set the rail level or parallel with the cross-head, and thus compensate for any disturbance of the extension-base or of the cross-head which may occur in practice. Having shown such diversity of construction, the scope of this improvement in the table-support will be fully understood.

By our improvements the operation of the tool upon any work-piece supported by the table is rendered much more accurate and the working of the machine is otherwise improved in various respects.

We are aware that two shafts have been connected by a species of eccentric coupling analogous to the connection between our disk and crank-plate; but such a construction does not adapt the crank-plate to operate directly by its crank-pin upon an oscillating pitman. To effect this readily, the disk and crank-plate in our invention are both overhung from the same bearing M', the disk being fitted to the outer side of the bearing and the shaft of the crank-plate fitted to a hole within the bearing which is eccentric to the journal of the disk. The overhung position of these parts is clearly shown in Fig. 2 of our drawings, which also exhibits the crank-pin projected into the slot of the pitman, by which construction all of the driving mechanism is disposed at one side of the pitman and the latter vibrated freely back and forth across the axis of both crank-plate and disk.

We are aware that it is old to fork the upper part of a pitman to clear a work-piece extended through the frame in line with the pitman; but to avoid the weakness of a fork we form our pitman with a boss $G^2$, having the opening $G^3$, through which the work-piece may be extended, and above the boss our pitman is connected by a lug with a forked block upon the ram, as shown in Fig. 2. The changes in these features are advantageous and distinguish our invention from those that are already known.

Having thus set forth the nature of the invention, what is claimed herein is—

1. In a crank-planer or shaping-machine having a reciprocating ram, the combination, with a driving-disk and an eccentric crank-plate fitted to the face of such disk, the disk and plate being overhung from the same bearing and the crank-plate being furnished with a crank-pin and connections to a reciprocating ram, of pins projected respectively from the driving-shaft and the crank-plate and connected by a link, whereby the uniform motion of the driving-disk produces a variable motion of the crank-plate, substantially as herein set forth.

2. In a crank-planer or shaping-machine having a reciprocating ram, the combination, with a driving-disk and an eccentric crank-plate fitted to the face of such disk, the disk and plate being overhung from the same bearing and the crank-plate being furnished with a crank-pin and connections to a reciprocating ram, of a pin projected from the outer side of the crank-plate, a link pivoted thereon and a slot in the crank-plate with pin upon the link projected through such slot and attached to the driving-disk, whereby the uniform motion of the driving-disk produces a variable motion of the crank-plate.

3. In a crank-planer or shaping-machine having a reciprocating ram, the combination, with a driving-disk having peripheral teeth to rotate the same, and an eccentrically-pivoted crank-plate fitted to the face of such disk, and having a crank-pin with block pivoted thereon, the ram D with pitman G pivoted positively thereto and having slot G' fitted to the crank-pin block, and the laterally-projecting link jointed to the bottom of the pitman and to a fixed bearing upon the frame, as and for the purpose set forth.

4. In a crank-planer or shaping-machine, the combination, with the driving-disk and eccentric plate linked thereto, as set forth, and having the crank-pin with block pivoted thereon, of the ram D having the pitman G pivoted positively thereto and having slot G' fitted to the crank-pin block, K, the laterally-projecting link I jointed to the bottom of the pitman and to a fixed bearing upon the frame, and the upper end of the pitman having the eye $G^3$ held at a uniform distance from the bottom of the ram by the pitman connection thereto, and adapted for the passage of a shaft or work-piece to the tool, substantially as herein set forth.

5. In a crank-planer or analogous tool having a work-table with a feed-screw to feed such table, and an oscillating lever to actuate such feed-screw, the combination, with such parts, of a disk having a cam-groove face, a bearing projected at right angles to the disk, a feed-shaft fitted to the bearing and provided with feed-crank and crank-pin upon its outer end connected with the oscillating lever, and the shaft having upon its inner end an arm with block or roll fitted to the cam-groove, substantially as herein set forth.

6. In a crank-planer having a reciprocating ram in the top and slotted pitman for reciprocating the same, the combination, with the ram and pitman, of a bearing upon the frame at one side of the pitman, the driving-disk journaled in such bearing and provided adjacent to the frame with the cam-groove $f$, the eccentric plate fitted to its face and provided with crank-pin connected to such pitman, and the means for actuating a feed mechanism by the driving-disk, comprising the bearing $b^2$ fitted detachably to the frame with an aperture in the frame at the inner end of such bearing, the feed-shaft fitted to the bearing and provided with feed-crank and crank-pin upon its outer end and the shaft being extended into such aperture and provided with an arm having a block fitted to the cam-groove, whereby the feed-crank is oscillated by the arm at each rotation of the driving-disk, substantially as herein set forth.

7. In a crank-planer or shaping-machine having a ram, a slotted pitman, a driving-disk and connections from the disk to such pitman for reciprocating the ram, the combination, with the frame, of a bearing, the driving-disk journaled in such bearing and provided with a cam-groove adjacent to the frame, a feed-shaft bearing fitted detachably, and the frame having an aperture at the inner end of such bearing, a feed-shaft with arm adjusted in such aperture and having upon the end a crank-pin with curved block fitted to the cam-groove, the detachable bearing permitting the insertion of the block in the groove and the driving-disk thus serving to oscillate the feed-shaft as required.

8. A crank-planer or analogous tool having a rotating driving-shaft and a feed-screw with oscillating lever to actuate the same, the combination, with such parts, of a disk having cam-groove in its face, said groove being partly concentric and partly with a flat curve connected abruptly to the ends of the concentric portion, a bearing projected at right angles to the disk, a feed-shaft fitted to the bearing and provided with feed-crank and crank-pin upon its outer end connected with the oscillating lever and the shaft having upon its inner end an arm with crank-pin having block fitted to the cam-groove, and the block provided upon its inner side with a notch to pass the two angles or corners of the groove, substantially as herein set forth.

9. In a crank-planer or shaping-machine having a cross-head with movable table to support the work and feed-screw to actuate such table with ratchet-gearing upon the feed-screw to rotate the same, the combination, with a reciprocating ram and pitman pivoted thereto, of a box-frame with plate at one side of such pitman, a bearing in such plate with driving-disk journaled therein, and an eccentric crank-plate fitted to the face of such disk with crank-pin connected to the pitman as set forth, a cam-groove in the driving-disk on the side next to the frame-plate, an aperture in the frame-plate for a feed-crank adjacent to such groove, a bearing fitted detachably to the frame-plate over such aperture, the feed-shaft in such bearing with arm having a roll or block fitted to the cam-groove, and the feed-shaft having an adjustable crank-pin with connection to the ratchet-gearing upon the cross-head, the whole arranged and operated substantially as herein set forth.

10. In a crank-planer or analogous tool having a main frame with cross-head or table adjustable vertically thereon, a feed-screw upon such cross-head or table, ratchet-gearing upon the cross-head or table to turn the feed-screw, an oscillating lever to actuate such ratchet-gearing with stops to regulate its movement, a feed-shaft upon the frame with a crank-pin to actuate the ratchet-gearing, a link connecting the crank-pin with the oscillating lever, and a friction sliding joint interposed between the feed-shaft and feed-screw, whereby the stops automatically vary the operation of the link upon the oscillating lever when the table is raised or lowered upon the frame.

11. In a crank-planer or analogous tool having a main frame with cross-head or table adjustable vertically thereon, and a feed-shaft having means for oscillating the same, and a crank-pin to actuate the feed-screw, the combination, with such parts, of ratchet-gearing to drive such feed-screw, a vibrating stud connected with such ratchet-gearing, stops to limit the opposite movements of such stud, and a link connecting such stud with the feed-crank pin and having a friction sliding joint between its extremities whereby the stops automatically change the length of the link when the table is raised or lowered upon the frame, substantially as herein set forth.

12. In a crank-planer having a ram with means for reciprocating the same, and a cross-head adjustable vertically beneath the ram with table to support the work-piece, and a fixed bearing upon the frame in the rear of such cross-head with feed-shaft and crank as set forth, the combination, with the cross-head and such feed-shaft, of the feed-screw upon the cross-head, ratchet-gearing to drive such feed-screw, a vibrating stud upon an oscillating lever connected with such ratchet-gearing, stops upon the cross-head to limit the opposite movements of such stud, and a link connecting such stud with the feed-crank pin and having a friction sliding joint between its extremities, whereby the stops automatically change the length of the link when the cross-head is raised or lowered upon the frame.

13. In a crank-planer or shaping-machine having an extension-base and a cross-head above the same with table movable thereon, the combination, with such parts, of a rail secured to the extension-base and having a rib extended from one edge of the rail over the upper surface of the rail, and a leg or standard projected from the table and offset laterally to rest upon the rail beneath such rib.

14. In a crank-planer or shaping-machine, the combination, with the machine-frame having an extension-base upon the front corner of the same, with a cross-head adjustable vertically above such base, of a rail secured upon such base and provided with means for varying the height of its opposite ends, to set it level or parallel with the cross-head, a table movable upon the cross-head, and a leg fitted to the top of the rail and vertically movable upon the table to compensate for the height of the table above the rail.

15. In a crank-planer or shaping-machine, the combination, with the machine-frame having an extension-base upon the front corner of the same with a cross-head adjustable vertically above such base, of a rail secured upon such base and provided with means for varying the height of its opposite ends to set it level, a table movable upon the cross-head, an adjustable leg fitted to vertical guides upon the table and having a level foot upon its lower end adapted as a gage for setting the rail, substantially as herein set forth.

16. In a crank-planer or shaping-machine, the combination, with the machine-frame having an extension-base upon the front corner of the same with a cross-head adjustable vertically above such base, of a rail secured upon such base and provided with means for varying the height of its opposite ends, a rectangular box-table movable upon the cross-head with a recess in its front side and vertical guides within such recess, a leg adjustable within such guides and provided with means for clamping it when adjusted, and such leg having a level foot at the bottom for setting the rail, substantially as herein set forth.

17. In a crank-planer or shaping-machine, the combination, with the machine-frame having an extension-base upon the front corner of the same with the cross-head adjustable vertically above such base, of a rail secured upon such base and provided with means for varying the height of its opposite ends, a rectangular box-table movable upon the cross-head and projected beyond the front edge of the base, a rail secured removably upon the front edge of the base and provided with means for varying the height of its opposite ends as set forth, the table having a recess in the front with vertical guides over the said rail, and having the leg fitted adjustably to such guides to rest upon the rail, substantially as herein set forth.

18. In a crank-planer or shaping-machine, the combination, with the machine-frame having an extension-base upon the front corner of the same with the cross-head adjustable vertically above such base, of a rail secured upon such base and provided with means for varying the height of its opposite ends, a rectangular box-table movable upon the cross-head and projected beyond the front edge of the base, the base having slots in its upper surface and a rail secured detachably upon the front edge of the base by bolts fitted to such slots, and the box having a recess in the front with a leg secured therein and adjustable vertically to rest upon the rail, substantially as herein set forth.

19. In a crank-planer or shaping-machine, the combination, with the machine-frame having an extension-base upon the front corner of the same, with a cross-head adjustable vertically above such base, of a table upon the cross-head with leg vertically movable upon the same, a rail secured upon the bed to support such leg and provided with means for pressing it upwardly against the under side of the leg to prevent the vibration of the table, substantially as herein set forth.

20. In a crank-planer or shaping-machine having an extension-base and a cross-head above the same with table movable thereon, the combination, with such parts, of a rail-bed secured to the extension-base, a rail attached to such bed, a screw for setting such rail parallel with the cross-head, and a leg upon the table to contact with the rail and vertically adjustable to compensate for the elevation of the cross-head, substantially as herein set forth.

21. In a crank-planer or shaping-machine having an extension-base and a cross-head above the same with table movable thereon, the combination, with such parts, of a rail-bed secured to the extension-base, a rail attached to such bed, a leg upon the table with means for adjusting it vertically to contact with the rail in various locations of the cross-head, and vertical screws for raising the rail upon its bed to assist in such compensation, and operating also to set the rail parallel with the cross-head and to press the rail against the bottom of the leg to prevent the vibration of the table.

22. In a crank-planer or shaping-machine having an extension-base and a cross-head above the same with table movable thereon, the combination, with such parts, of a rail-bed secured to the extension-base, and having vertical guides as set forth, a rail fitted to such vertical guides and having gibs to clamp the same, the two screws fitted to the rail-bed and rail to vary the height of its opposite ends, as and for the purpose set forth.

23. In a crank-planer or shaping-machine, the combination, with a shaping-machine having an extension-base and a cross-head above the same with table movable thereon, of a leg projected from the table and a rail supported upon the base to sustain such leg, the rail having a seat to support the leg, and a rib elevated above such seat to protect the same from abrasion.

24. In a crank-planer or shaping-machine, the combination, with a shaping-machine having an extension-base and a cross-head above the same with table movable thereon, of a leg projected from the table and a rail supported upon the base to sustain such leg, the rail having a seat to support the leg, a rib lifted above such seat to form a foot-rest, and a gutter between such rib and seat to receive dirt and grit, as and for the purpose set forth.

25. In a crank-planer or shaping-machine, the combination, with the machine-frame having an extension-base at the front, with a cross-head adjustable vertically above such base and table movable horizontally upon such cross-head, of a rail secured upon such base and provided with means for positively varying the height of its opposite ends to set it level or parallel with the cross-head, and a projection from the table to rest upon such rail.

In testimony whereof we, the said H. E. EBERHARDT and F. L. EBERHARDT, have signed our names to this specification, in the presence of two subscribing witnesses, at Newark, Essex county, New Jersey.

HENRY E. EBERHARDT.
FRED L. EBERHARDT.

Witnesses:
C. MCNEILL,
THOMAS S. CRANE.

In testimony whereof I, the said E. G. EBERHARDT, have signed my name to this specification, in the presence of two subscribing witnesses, at Ithaca, Tompkins county, New York.

ELMER G. EBERHARDT.

Witnesses:
F. W. POATE,
WM. NEFF.